(12) United States Patent
Bügner

(10) Patent No.: US 7,549,199 B2
(45) Date of Patent: Jun. 23, 2009

(54) DEVICE FOR CONNECTING A CARRIER PART AND AN ADD-ON PIECE

(75) Inventor: Eric Bügner, Buchenbach (DE)

(73) Assignee: A. Raymond et Cie, Grenoble (FR)

( * ) Notice: Subject to any disclaimer, the term of this patent is extended or adjusted under 35 U.S.C. 154(b) by 96 days.

(21) Appl. No.: 10/596,292

(22) PCT Filed: Oct. 14, 2004

(86) PCT No.: PCT/EP2004/011516
§ 371 (c)(1),
(2), (4) Date: Oct. 24, 2007

(87) PCT Pub. No.: WO2005/060331
PCT Pub. Date: Jul. 7, 2005

(65) Prior Publication Data
US 2008/0276436 A1 Nov. 13, 2008

(30) Foreign Application Priority Data
Dec. 12, 2003 (DE) ................. 103 58 683

(51) Int. Cl.
A41F 1/00 (2006.01)
(52) U.S. Cl. ............... 24/297; 24/289; 24/453; 403/408.1; 411/508; 411/510; 411/908
(58) Field of Classification Search .......... None
See application file for complete search history.

(56) References Cited

U.S. PATENT DOCUMENTS

| 4,312,165 A | * | 1/1982 | Mizusawa | 52/511 |
| 4,505,611 A | * | 3/1985 | Nagashima et al. | 403/21 |
| 5,507,610 A | * | 4/1996 | Benedetti et al. | 411/339 |
| 5,651,634 A | * | 7/1997 | Kraus | 403/408.1 |
| 5,689,863 A | * | 11/1997 | Sinozaki | 24/297 |
| 5,765,959 A | * | 6/1998 | Shioda | 403/199 |
| 6,039,523 A | * | 3/2000 | Kraus | 411/48 |
| 6,254,302 B1 | * | 7/2001 | Kraus | 403/326 |
| 6,594,870 B1 | * | 7/2003 | Lambrecht et al. | 24/297 |
| 6,984,096 B2 | * | 1/2006 | Kraus | 411/48 |
| 7,017,239 B2 | * | 3/2006 | Kurily et al. | 24/297 |
| 7,114,221 B2 | * | 10/2006 | Gibbons et al. | 24/289 |

(Continued)

FOREIGN PATENT DOCUMENTS

DE 19807953 8/1999

(Continued)

Primary Examiner—Jack W. Lavinder
(74) Attorney, Agent, or Firm—Baker & Daniels LLP

(57) ABSTRACT

A device for connecting a carrier part and an add-on piece. The device includes a receiving part (1), an anchoring part (3) and a connecting part (2). The connecting part can be connected to the receiving part (1) and the anchoring part (3). The connecting part (2) is provided with two flange disks (13, 14) that are connected to each other via an interpiece. The receiving part (1) is configured with a plurality of arms (19) that bend away from the direct connecting line between an inner receiving element (21) serving to receive the interpiece, and an outer fixing region. The flange disks (13, 14) clasp, edgewise, a plate-shaped region (16) in which the outer fixing region of the arms (19) is disposed.

7 Claims, 3 Drawing Sheets

U.S. PATENT DOCUMENTS 7,152,281 B2 * 12/2006 Scroggie .................. 24/297
7,281,303 B2 * 10/2007 Terrill et al. ............... 24/453
7,328,489 B2 * 2/2008 Leverger et al. ........... 24/453

FOREIGN PATENT DOCUMENTS

| DE | 10064017 C2 | 5/2002 |
| EP | 0648944 | 6/2006 |
| FR | 2800833 | 5/2001 |

\* cited by examiner

DEVICE FOR CONNECTING A CARRIER PART AND AN ADD-ON PIECE

BACKGROUND OF THE INVENTION

The invention relates to a device for connecting a carrier part to an add-on part.

Such a device is known from U.S. Pat. No. 6,594,870 B1. The prior device is provided with a connecting part comprising two flange disks connected to each other via an interpiece. Further provided is a receiving part, which is intended to be affixed to an add-on part and is configured as cage-like. On its side facing away from the add-on part, the receiving part is provided with a number of arms designed to permit some degree of lateral movement, which arms are connected inwardly to a ring-like, open receiving element and outwardly, in a fixing region, to side walls of the receiving part. The arms are configured as straight, and extend radially between the receiving element and the fixing region concerned. The interpiece can be inserted into the receiving element so that the flange disks clasp the arms in the region of the receiving element. In addition, the connecting part is implemented with a snap-lock structure. Finally, the prior device has an anchoring part that can be connected to a carrier part. The anchoring part is configured with an additional snap-lock structure, which cooperates with the snap-lock structure of the connecting part to make it possible to adjust a distance between the connecting part and the anchoring part.

Known from DE 198 07 953 A1 is a device for connecting an add-on part to a carrier part, which device is provided with a receiving part. In this device, the receiving part is implemented with a baseplate that can be connected to the add-on part. The central region of the baseplate is configured with a round recess, from the rim of which three comparatively thin arms extend spirally inward. The arms terminate inwardly at a closed inner ring. On the side of the baseplate oriented away from the add-on part, the receiving part is configured with a pocket into which a roundish flange disk of a connecting part can be inserted through an insertion slit that surrounds an interpiece of the connecting part. The radial dimensions of the flange disk and the interpiece are smaller than those of the pocket and the insertion slit. The connecting part is provided with an additional flange disk that is disposed outside the pocket, a wall of the pocket that is parallel to the baseplate being fitted between the flange disks. Implemented on the baseplate-facing side of the flange disk that is disposed inside the pocket is a dome-like elevation, which is positioned inside the inner ring after the connecting part is fitted into the receiving part. As a result, the connecting part is laterally translatable in two directions for purposes of tolerance compensation.

The object of the invention is to specify a device of the kind cited at the beginning hereof which has high stability and can be subjected to comparatively large extractive forces, and at the same time has good tolerance compensation combined with simple construction.

SUMMARY OF THE INVENTION

The invention comprises a device for connecting a carrier part and an add-on piece. The device includes a receiving part, an anchoring part, and a connecting part which interconnect the anchoring part and the receiving part. The connecting part includes two flange disks which are connected to each other via an interpiece. The receiving part includes a plurality of arms which bend away from the direct connecting line between an inner receiving element which serves to receive the interpiece, and an outer fixing region. The flange disks clasp, edgewise, a plate-shaped region in which the outer fixing region of the arms is disposed.

In the inventive device, the arms are bent, at least segmentally, and the flange disks clasp the arms and, edgewise, the plate-shaped region to which the arms are outwardly attached yields a connection between the receiving part and the connection part that is very stable and is also resistant to comparatively high traction forces, with good tolerance compensation in a total of three dimensions.

Further practical embodiments of the invention are the subject of the dependent claims.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
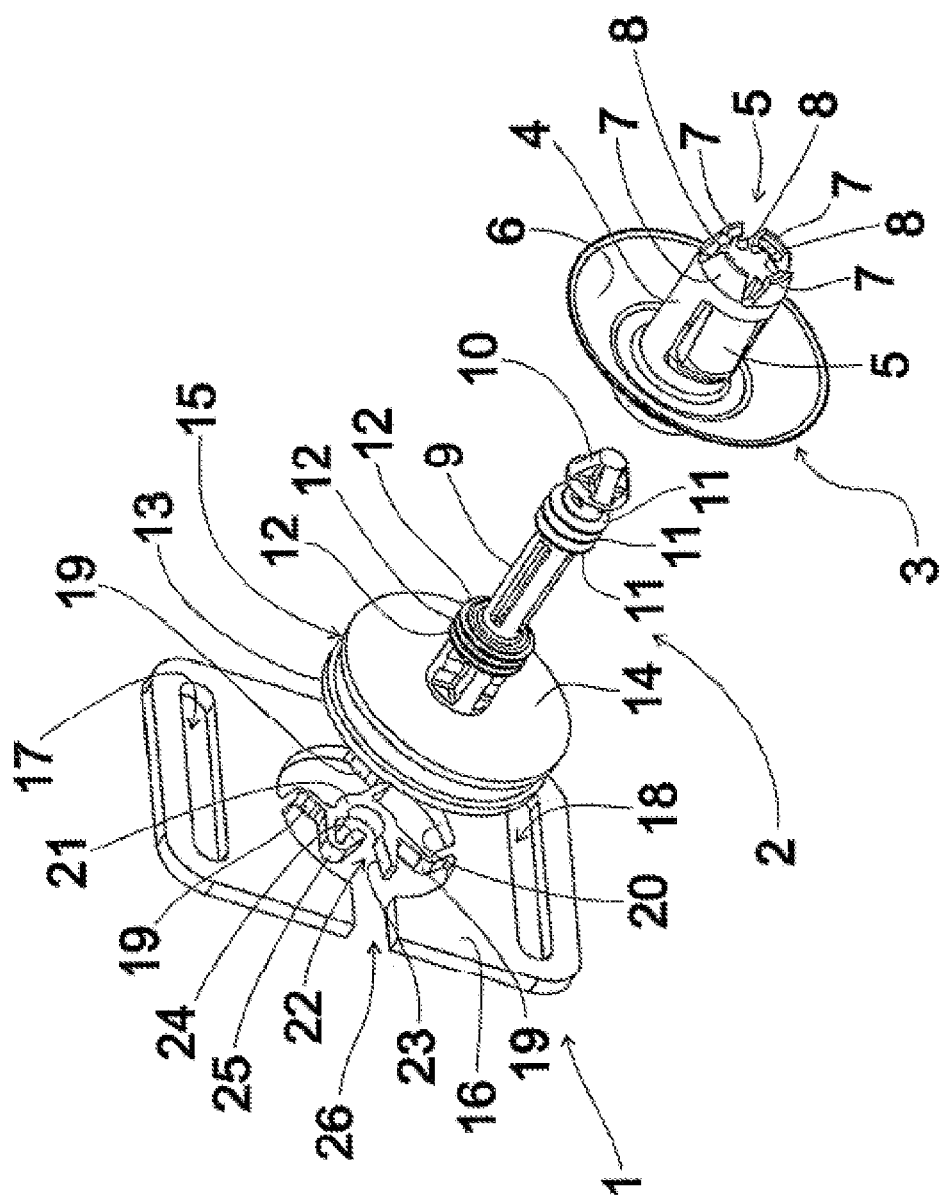
FIG. 1 is a perspective exploded view of a preferred exemplary embodiment of the invention, comprising an add-on part, a connecting part and an anchoring part.

Corresponding reference characters indicate corresponding parts throughout the several views. Although the exemplifications set out herein illustrate embodiments of the invention, in several forms, the embodiments disclosed below are not intended to be exhaustive or to be construed as limiting the scope of the invention to the precise forms disclosed.

DESCRIPTION OF THE PRESENT INVENTION

FIG. 1 illustrates, in a perspective exploded view, a preferred exemplary embodiment of the invention comprising a receiving part 1, a connecting part 2 and an anchoring part 3.

The anchoring part 3 is provided with a substantially cylindrical anchoring bush 4 comprising two mutually opposite, laterally protruding anchoring tabs 5. The anchoring bush 4 can be fitted into a recess of a carrier part (not shown in FIG. 1), causing anchoring tabs 5 to engage with the carrier part. In addition, anchoring part 3 is configured with a shield 6 that is disposed at the back end of anchoring bush 4 (as viewed in the direction of insertion of anchoring part 3) and projects radially beyond anchoring bush 4. Shield 6 is open in the direction of the free end of anchoring bush 4. Present at the free end of anchoring bush 4 are inward-bent, bar-like edge tabs 7 configured at their outer ends with snap noses 8 forming a snap-lock structure.

Connecting part 2 is provided with a bolt shaft 9, on a free end of which a forwardly beveled insertion tip 10 is formed. In the region of insertion tip 10, bolt shaft 9 is provided with a number of snap rings 11, which constitute an additional snap-lock structure and, as described in more detail below, cooperate with the snap noses 8 when bolt shaft 9 is inserted into anchoring bush 4. At the opposite end from snap rings 11, a number of flexible sealing rings 12 are formed on bolt shaft 9. At the opposite end from insertion tip 10, connecting part 2 is provided with an outer, first flange disk 13 and an inner, second flange disk 14, which are configured as roundish and are spaced apart from each other in the longitudinal direction of connecting part 2, so that a gap 15 is formed between flange disks 13, 14.

In the exemplary embodiment illustrated in FIG. 1, receiving part 1 is configured, very advantageously from a production engineering standpoint, as a flat, rectangular plate 16, whose thickness is substantially the same as the distance between flange disks 13, 14 of connecting part 2. Formed in plate 16 and oriented parallel to the shorter edges are a first oblong hole 17 and a second oblong hole 18 adapted to receive correspondingly dimensioned connection bars of an an-add part not illustrated in FIG. 1.

Formed in the central region of plate 16 are a number of arms or spokes 19, which are attached at their outer ends to a roundish inside edge 20 of plate 16 whose inner diameter is smaller than the outer diameter of the two flange disks 13, 14, and which extend inwardly such that they bend away from a radial direction, and which are joined to an open inner ring 21 serving as a receiving element. Inner ring 21 is provided with a beveled and substantially radially oriented guide nose 23 bordering on an insertion opening 22, and an arresting nose 25 that is bent and points by a resilient snap-lock end 24 in the direction of inner ring 21. Opposite insertion opening 22, plate 16 is configured with an insertion slit 26 oriented substantially parallel to the shorter edges and extending from inside edge 20 to the outside of plate 16.

Figure 2:
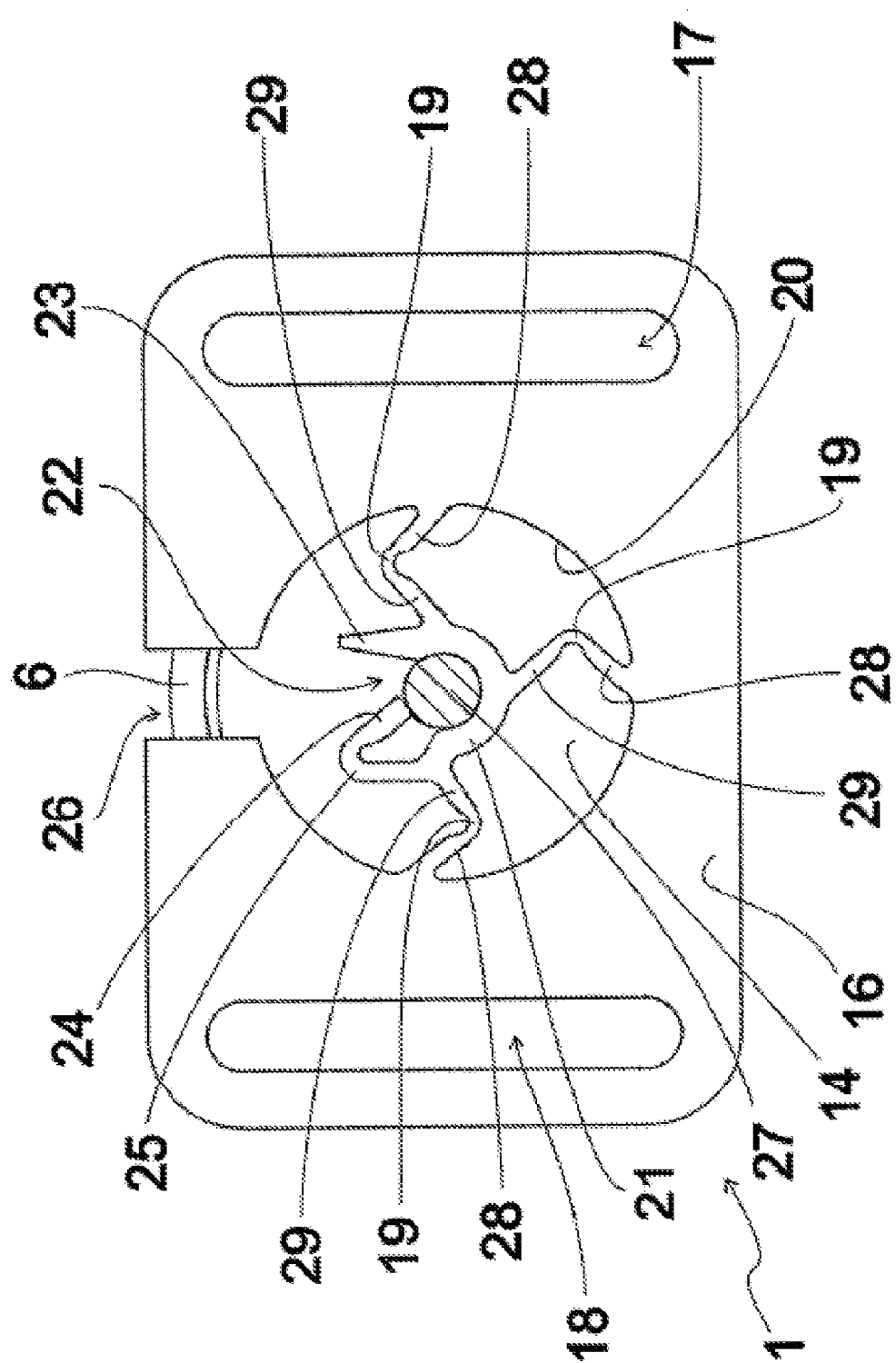
FIG. 2, depicting the exemplary embodiment of FIG. 1, is a section through an interpiece of the connecting part, looking toward the add-on part.

FIG. 2 shows a section, based on the exemplary embodiment of FIG. 1, through an interpiece 27 connecting the two flange disks 13, 14 of connecting part 2, looking in the direction of add-on part 1. In the representation of FIG. 2, interpiece 27, having been guided through insertion slit 26 and insertion opening 22, is disposed within inner ring 21, in which process the snap-lock end 24 of arresting nose 25, after deflecting, engages behind interpiece 27 and thereby prevents it from slipping out.

It is further apparent from FIG. 2 that in the exemplary embodiment shown, each arm 19 is provided with an elbow, thus defining an outer arm segment 28 that bends away from the direct connecting line between the regions of fixation of the arm 19 concerned to inside edge 20 and to inner ring 21, and an inner arm segment 29 that also bends away from this direct connecting line, the two segments being oriented roughly perpendicularly to each other. Each arm 19 thereby lends inner ring 21 relatively high mobility in the plane of plate 16, so that connecting part 2 is able to move in both directions perpendicular to the longitudinal direction of connecting part 2 to bring about tolerance compensation. Since the two flange disks 13, 14 clasp plate 16 in the region of inside edge 20, high transverse stability is also present, and connecting part 2 is connected to receiving part 1 fixedly in the longitudinal direction.

Figure 3:
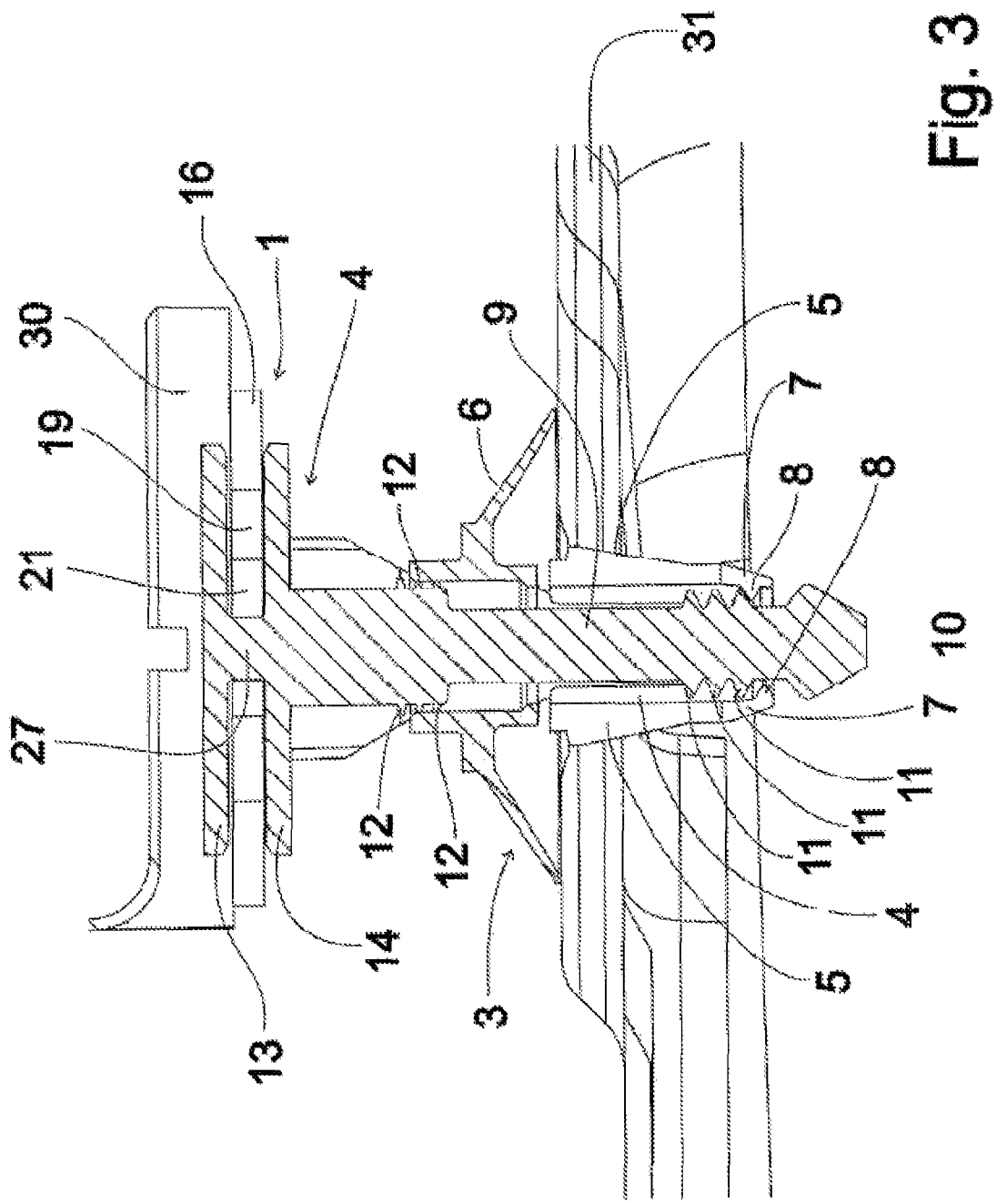
FIG. 3 is a longitudinal section through the exemplary embodiment of FIGS. 1 and 2 in an installed situation, with a carrier part and an add-on part.

FIG. 3 is a longitudinal section through the exemplary embodiment of FIGS. 1 and 2 in an installed situation with an add-on part 30 connected to receiving part 1 and with a carrier part 31 connected to anchoring part 3, wherein bolt shaft 9 is inserted into anchoring bush 4 but snap noses 8 and snap rings 11 of the snap-lock structures are not yet engaged with one another. It is apparent from FIG. 3 that the snap noses 8 formed on snap tabs 7 are disposed in pairs opposite each other in different longitudinal positions whose spacing in each case is equal to half the distance between the snap rings 11. This results in a relatively fine gradation for the relative positioning of receiving part 1 and anchoring part 3 in the longitudinal direction.

It can also be appreciated from FIG. 3 that after bolt shaft 9 is inserted all the way into anchoring bush 4, sealing rings 12 form a sort of labyrinth seal, while shield 6 is pressed against the side of carrier part 31 that faces add-on part 30 and thereby seals the recess made in carrier part 31 to receive anchoring part 3. Very good sealing of carrier part 31 is achieved in this manner.

Finally, FIG. 3 makes it apparent that the connection produced by the engagement of both flange disks 13, 14 of connecting part 2 with plate 16 of receiving part 1 is resistant even to the relatively high extractive forces needed to disengage the interlock between snap noses 8 and snap rings 11.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is;

1. A device for connecting a carrier part to an add-on part, said device comprising:
   an anchoring bush, said bush adapted to be anchored in said carrier part, said bush including a first snap-lock structure, an elongated connecting part having two disks secured thereto, said disks spaced apart from each other by an interpiece, said connecting part including a second snap-lock structure for interlocking said first and second snap locks and for cooperating with said first snap-lock structure to permit the distance between said receiving part and said anchoring bush to be lockingly adjusted; and
   a receiving part comprising a ring-like open receiving element and a fixing region, a plurality of arms connecting said receiving element to said fixing region, said arms including elbows, said disks claspingly receiving said fixing region, said ring-like receiving element receiving said interpiece, whereby said elbows permit said interpiece to move relative to said fixing region in a direction perpendicular to the direction of elongation of said connecting part.

2. The device of claim 1 wherein said receiving part is a flat plate.

3. The device of claim 1 wherein said elbow defines two segments of said arm, said segments disposed at an angle smaller than 180 degrees relative to each other.

4. The device of claim 3 wherein said segments are disposed at right angles to each other.

5. The device of claim 1 wherein said receiving element comprises an annulus with an insertion opening disposed therein, a guide nose disposed adjacent said opening, and an arresting nose with a snap-lock end disposed adjacent said opening, said snap-lock end flexing towards said opening and adapted to lock said interpiece in place.

6. The device according to claim 1 wherein said first snap-lock structure comprises a snap ring and said second snap-lock structure comprises a snap nose.

7. The device according to claim 6 wherein said snap noses are disposed in the longitudinal direction at a distance from each other which is equal to half the distance between said snap rings.

* * * * *